(12) United States Patent
Tang

(10) Patent No.: US 7,677,510 B2
(45) Date of Patent: Mar. 16, 2010

(54) TRIPOD FOR A CAMERA

(75) Inventor: Cheng-Syun Tang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 12 days.

(21) Appl. No.: 11/960,664

(22) Filed: Dec. 19, 2007

(65) Prior Publication Data
US 2009/0101771 A1    Apr. 23, 2009

(30) Foreign Application Priority Data
Oct. 17, 2007    (CN) .......................... 2007 1 0202100

(51) Int. Cl.
*F16M 11/26*    (2006.01)
*F16M 11/38*    (2006.01)
*F16M 11/02*    (2006.01)

(52) U.S. Cl. .............. 248/188.5; 248/188.6; 248/177.1; 248/431

(58) Field of Classification Search ............. 248/188.5, 248/168, 177.1, 187.1; 89/40.06
See application file for complete search history.

(56) References Cited

U.S. PATENT DOCUMENTS

| 873,121 | A | * | 12/1907 | Flory ....................... 248/177.1 |
| 3,615,257 | A | * | 10/1971 | Frost et al. .................. 422/101 |
| 5,862,967 | A | * | 1/1999 | Johnson ..................... 224/577 |
| 2005/0121569 | A1 | * | 6/2005 | Willey ........................ 248/168 |

* cited by examiner

*Primary Examiner*—J. Allen Shriver, II
*Assistant Examiner*—Erin Smith
(74) *Attorney, Agent, or Firm*—Zhigang MA

(57) ABSTRACT

A tripod for supporting a camera includes a main body, a supporting plate pivotally connecting with a top of the main body for mounting the camera and three telescopic legs pivotally connecting with a bottom of the main body. Each of at least two of the three telescopic legs comprises a fist section pivotally connecting with the main body and a second section telescopically received in the first section. The second section comprises a first pivotal portion and a second pivotal portion pivotally engaging with the first pivotal portion. The second pivotal portion can be foldable relative to around the first pivotal portion to form an angle between the first and second pivotal portions.

13 Claims, 4 Drawing Sheets

TRIPOD FOR A CAMERA

BACKGROUND OF THE INVENTION

1. Field of the Invention

The present invention relates to a tripod, and more particularly to a tripod for securing a camera.

2. Description of related art

Referring to FIG. 4, a related camera tripod comprises a main body 70, three telescopic legs 90 pivotally connected with the main body 70 and a supporting plate 60 for holding a camera (not shown). When the legs 90 pivotably rotate relative to the main body 70, the legs 90 of the tripod can be opened up for securely supporting the camera. Each leg 90 has a first pipe (not labeled) pivotally connected with the main body 70 and a second pipe (not labeled) telescopically arranged within the first pipe for adjusting the height of the tripod.

However, if it desired to capture an image of an object from the point of view directly above the object, then at least two of the legs of the tripod holding the camera must be closed so that the tripod can be tilted over allowing the camera to be aimed directly down. This is inconvenient and defeats the purpose of the tripod which is to provide a stable platform from which to capture.

What is needed, therefore, is a tripod which can mount a camera and allow a greater range of motion for swiveling/pointing the camera.

SUMMARY OF THE INVENTION

A tripod for supporting a camera includes a main body, a supporting plate pivotally connecting with a top of the main body for mounting the camera and three telescopic legs pivotally connecting with a bottom of the main body. Each of the least two of the three telescopic legs comprises a fist section pivotally connecting with the main body and a second section telescopically received in the first section. The second section comprises a first pivotal portion and a second pivotal portion pivotally engaging with the first pivotal portion. The second pivotal portion can be foldable relative to the first pivotal portion to form an angle between the first and second pivotal portions.

BRIEF DESCRIPTION OF THE DRAWINGS

Many aspects of the present tripod can be better understood with reference to the following drawings. The components in the drawings are not necessarily drawn to scale, the emphasis instead being placed upon clearly illustrating the principles of the present tripod. Moreover, in the drawings, like reference numerals designate corresponding parts throughout the several views.

DETAILED DESCRIPTION OF THE INVENTION

Figure 1:
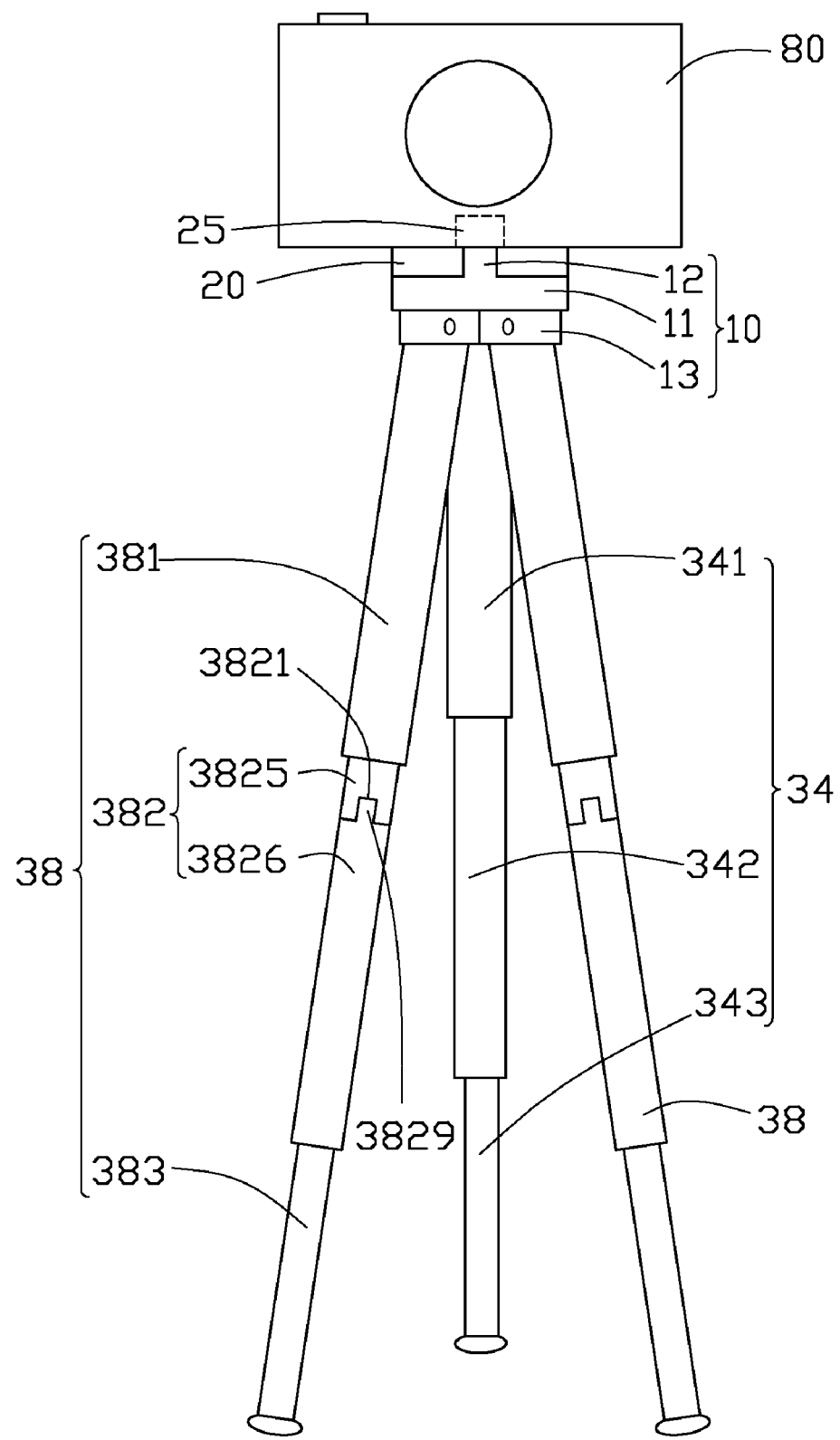
FIG. 1 is an isometric view of a tripod supporting a camera in accordance with a preferred embodiment of the present invention.
Figure 2:
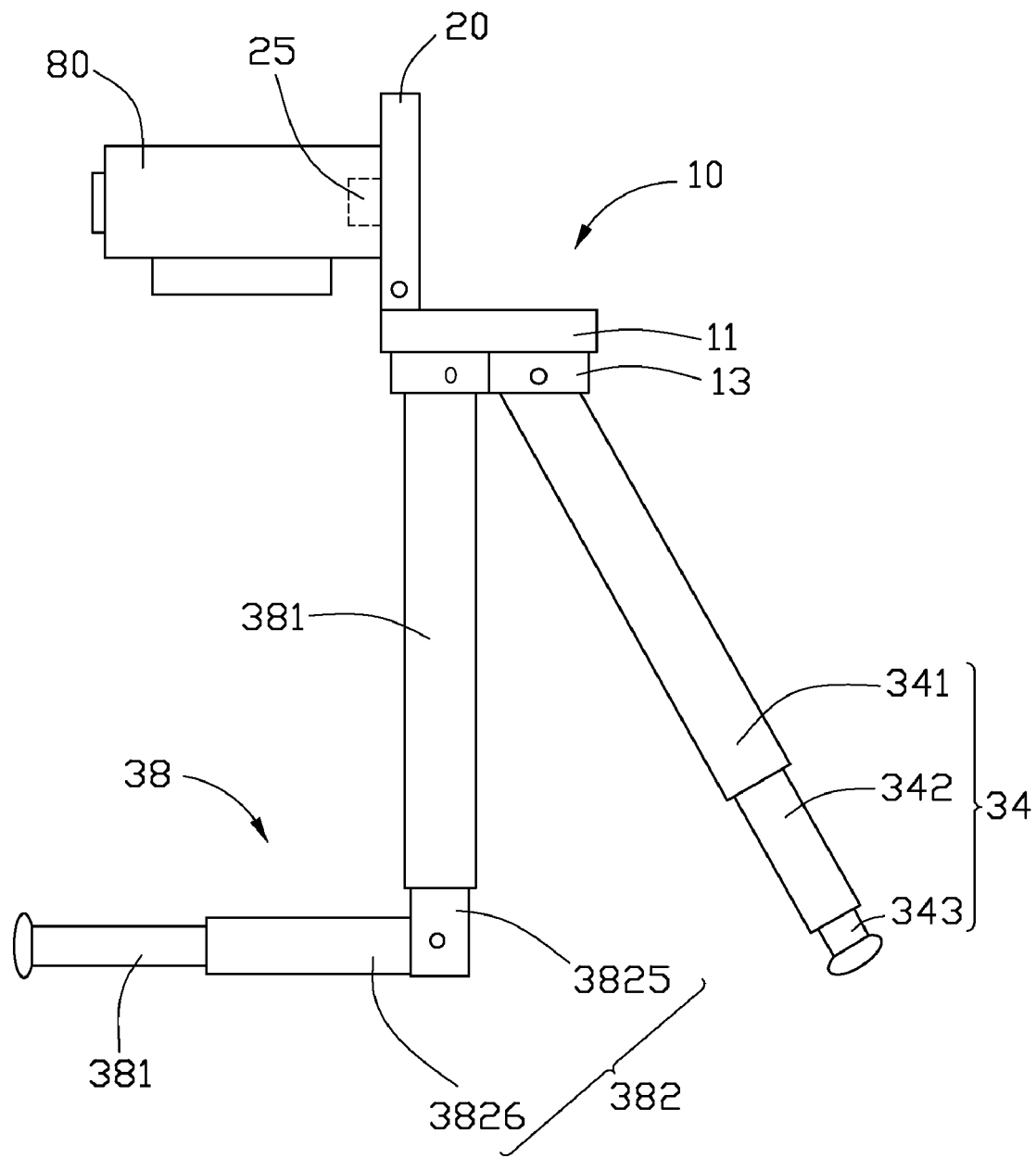
FIG. 2 is a side view of FIG. 2, the camera being set to shoot in a vertical direction.

Referring to FIGS. 1-2, a tripod (not labeled) of a preferred embodiment of the invention comprises a main body 10, a first telescopic leg 34 and two telescopic second legs 38 pivotally connected with the main body 10, and a supporting plate 20 mounted on the main body 10 for holding a camera 80. The tripod is configured to allow a user to point a camera in virtually any direction by merely folding the legs to an appropriate degree and swiveling and/or pivoting a plate of the tripod the camera is mounted on.

The main body 10 comprises a base 11, a connecting portion 12 extending upwardly from a lateral side of a top surface of the base 11, and three pivotal portions 13 extending downwardly from a bottom surface of the base 11. The three pivotal portions 13 are configured for connecting with the first and second legs 34, 38.

The supporting plate 20 has a rectangular configuration. A groove (not shown) is defined in a lateral portion of the supporting plate 20 for receiving the connecting portion 12 of the main body 10. The supporting plate 20 pivotally engages with the connecting portion 12 via a pin (not labeled) extending through the lateral portion of the supporting plate 20 and the connecting portion 12. Thus, the supporting plate 20 can rotate around the connecting portion 12 of the main body 10 from a first position at which the supporting plate 20 is parallel to a top surface of the main body 10 to a second position at which the supporting plate 20 is perpendicular to the top surface of the main body 10. A screw 25 engages with the supporting plate 20 and protrudes uprightly from a central portion of the supporting plate 20. The screw 25 is engaged in a bottom portion of the camera 80 so as to perpendicularly secure the camera 80 on the supporting plate 20.

The first leg 34 and the second legs 38 each comprises two or more sections; in this embodiment, the first leg 34 and the second legs 38 each comprises three sections.

The first leg 34 comprises a first section 341, a second section 342 and a third section 343. The sections 341, 342, 343 each have a tubular configuration. A diameter of the second section 342 is less than that of the first section 341, and a diameter of the third section 343 is less than that of the second section 342. Accordingly, the second section 342 has an upper end received in a lower end of the first section 341, and a lower end receiving an upper end of the third section 343. The second section 342 can slide in the first section 341 along an axis thereof and the third section 343 can slide in the second section 342 thereof. In other words, the second section 342 is telescopically arranged within the first section 341 and the third section 343 is telescopically arranged within the second section 342 so as to adjust the length of the first leg 34. Once a total length of the first leg 34 is determined, relative positions among the first, second and third sections 341, 342, 343 of the first leg 34 can be locked via a locking system, such as an ALR (Anti Leg Rotation) system. Thus, the first, second and third sections 341, 342, 343 of the first leg 34 are fastened to each other. The first leg 34 connects pivotally with the main body 10 via an upper end of the first section 341 pivotally connecting with one pivotal portion 13 located apart from the connecting portion 12 of the main body 10.

Each of the second legs 38 is similar to the first leg 34, comprising a first section 381, a second section 382 and a third section 383. The configurations of the first sections 381 and the third sections 383 of the second legs 38 are the same as that of the first section 341 and the third section 342 of the first leg 34. The third sections 383 of the second legs 38 have upper ends pivotally connected to two other pivotal portions 13 of the main body 10. A difference between the second section 382 of the second leg 38 and the second section 342 of the first leg 34 is that the second section 382 comprises a first pivotal portion 3825 and a second pivotal portion 3826 pivotally connecting with the first pivotal portion 3825. The first pivotal portion 3825 has an upper end received in the first section 381 and a groove 3821 defined at a lower end. The second pivotal portion 3826 extends a protrusion 3829 from an upper end thereof. The protrusion 3829 is received in the groove 3821 of the first pivotal portion 3825 and engages pivotally with the first pivotal portion 3825 via a connecting member such as a pin (not labeled) extending therethrough Accordingly, the second pivotal portion 3826 can be rotated around the pin, and each second leg 38 forms an angle between an upper portion thereof which comprises the first section 381 and first pivotal portion 3825, and a lower portion thereof which comprises the second pivotal portion 3826 and the third section 383. In this embodiment, the lower portion of the second leg 38 can be rotated 90 degrees relative to the upper portion of the second leg 38. Simultaneously, by adjusting the total length of the first leg 34 and an opening degree of the first leg 34 relative to the main body 10, the tripod can still stand firmly on an available surface. Each of the third sections 343, 383 of the first and second legs 34, 38 has a rubber foot mounted on a lower end thereof for improving traction thereof.

When the tripod is used to support the camera 80 for shooting in the horizontal direction, referring again to FIG. 2, the first leg 34 and the second legs 38 rotates outwardly relative to the main body 10. When the first and second legs 34, 38 are opened to an appropriate angle, the tripod is in a stable or steady state. Particularly, the first pivotal portion 3825 and the second pivotal portion 3826 of each of the second legs 38 are aligned and fixed (by any known means in the art) in a same orientation to provide the aforementioned steady state. In the steady state, the supporting plate 20 is parallel and attached to the top surface of the main body 10. Thus, the camera 80 can shoot straight along a line parallel to the second legs 38.

Figure 3:
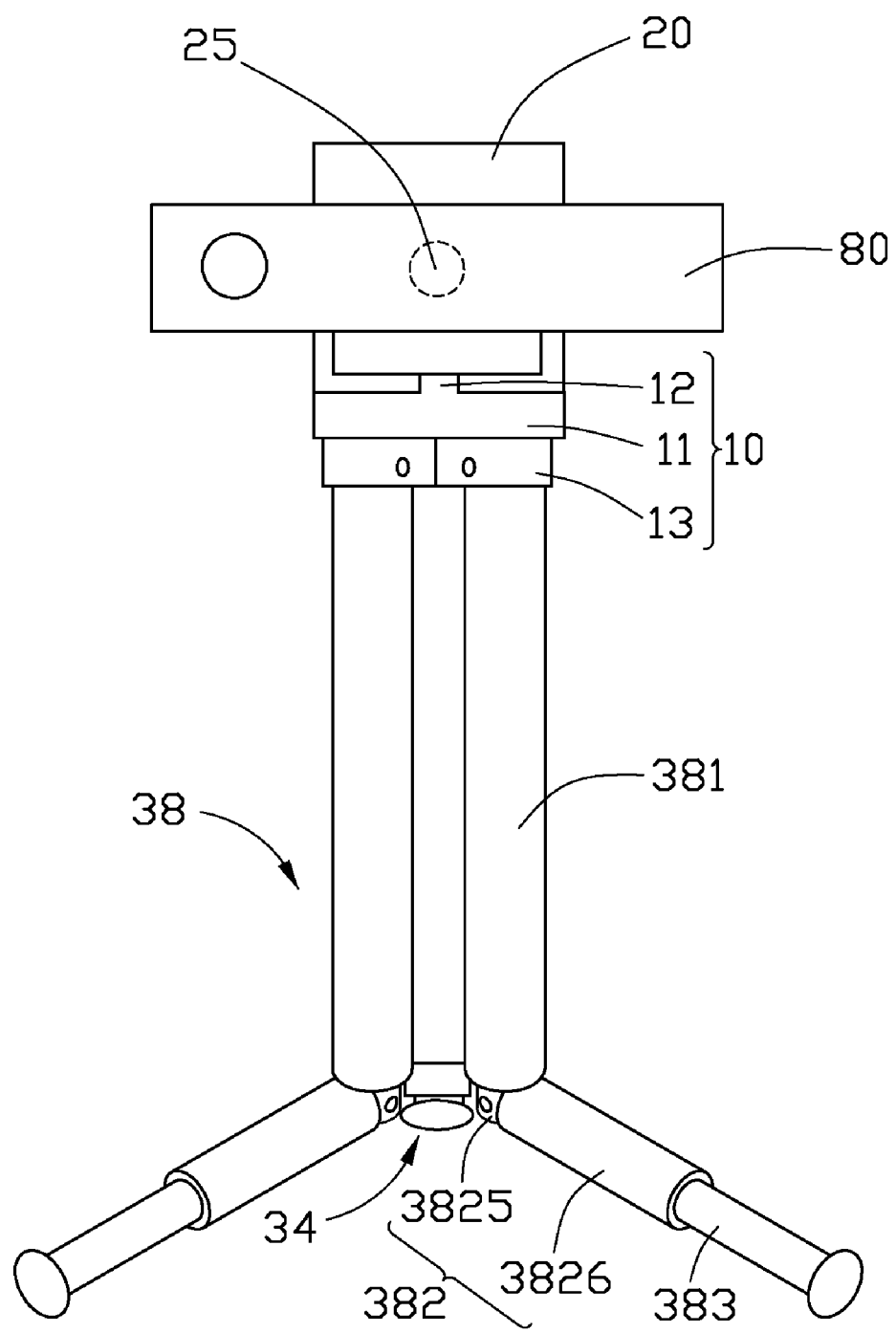
FIG. 3 is a view similar to FIG. 3, but viewed from a different aspect.
Figure 4:
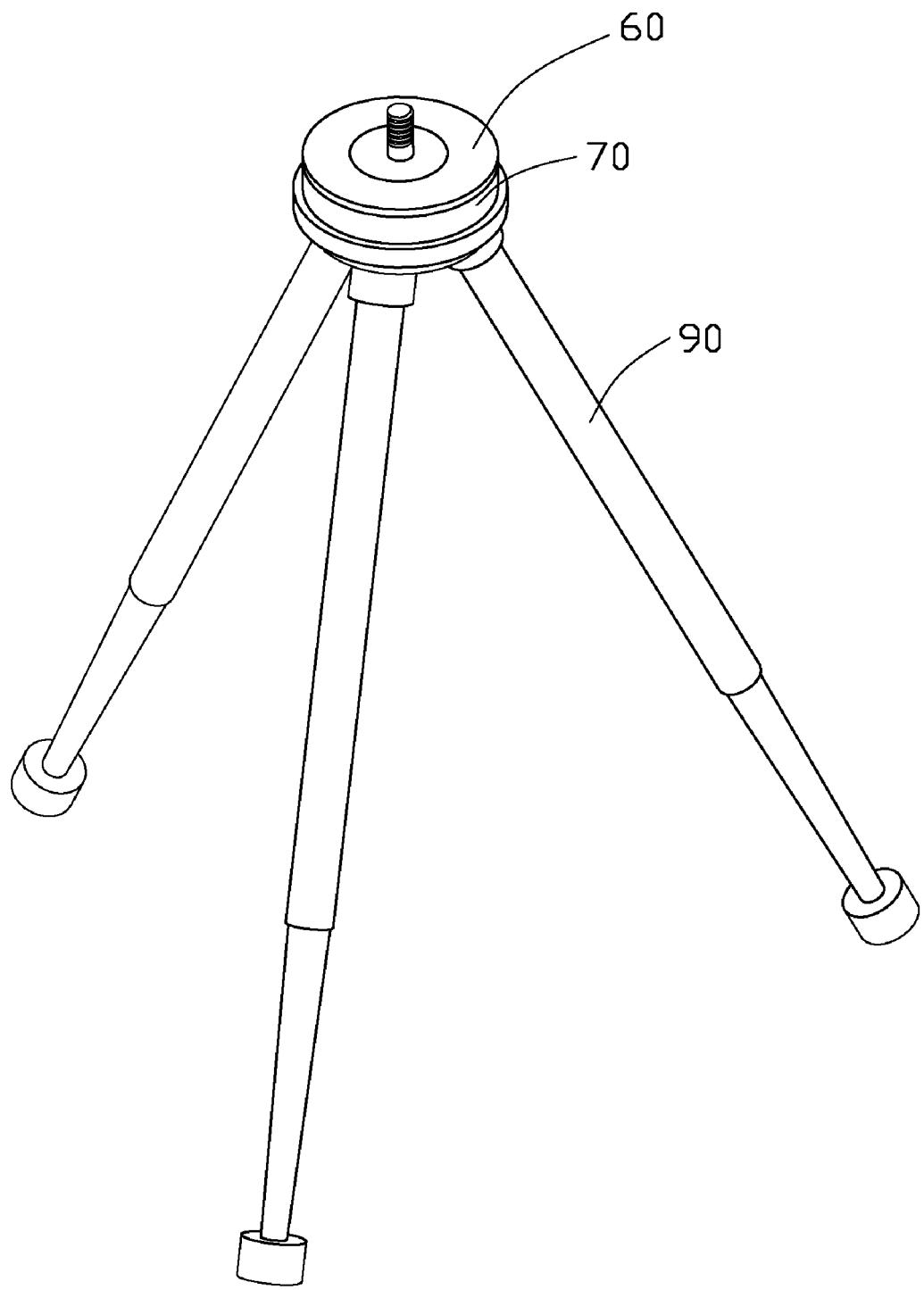
FIG. 4 is an isometric view of a related tripod.

When the tripod is used to support the camera 80 for shooting books or magazines on the table in the vertical direction, referring to FIGS. 3-4, the upper portion of each of the second legs 38 which comprises the first section 381 and first pivotal portion 3825 reaches a closed state to be perpendicular to the table. The lower portion of each of the second legs 38 which comprises the second pivotal portion 3826 and the third section 3826 attaches to the table to be perpendicular to the upper portion of the second legs 38. Because the second section 382 can rotates around a central axis thereof relative to the first section 381, the two lower portions of the second legs 38 can be adjusted to form an angle therebetween. The books or magazines are positioned between the lower portions of second legs 38 on the table. A length of the first leg 34 and an opening degree of the first leg 34 relative to the main body 10 are adjusted for contacting the table for supporting steadily the tripod and the camera 80. In this state, the supporting plate 20 is rotated around the connecting portion 12 of the main body 10 and perpendicular to the top surface of the main body 10. Accordingly, the camera 80 mounted on the supporting plate 20 shoots the books or magazines in the vertical direction. Thus, the tripod helps the camera 80 shoot the books or magazines in a close distance steadily and conveniently.

Alternatively, the first leg 34 can be set to have the same configuration as the second leg 38. In other words, the second section 342 of the first leg 34 can be set to comprise a first pivotal portion and a second pivotal portion pivotally connecting with the first pivotal portion. By the provision of the telescopic legs, the tripod can be used more conveniently.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A tripod comprising:
   a main body;
   a supporting plate pivotally connecting with a top of the main body; and
   three telescopic legs pivotally connecting with a bottom of the main body, each of at least two of the three telescopic legs comprising a first section pivotally connecting with the main body and a second section telescopically received in the first section, the second section comprising a first pivotal portion and a second pivotal portion pivotally engaging with a lower end of the first pivotal portion, the second pivotal portion being pivotable relative to the first pivotal portion to form an angle between the first and second pivotal portions when the second section is extended from the first section.

2. The tripod as described in claim 1, wherein the second pivotal portion is pivotable to be perpendicular to the first portion of the second section of the at least two legs.

3. The tripod as described in claim 2, wherein the first pivotal portion defines a groove at the lower end thereof, the second pivotal portion forming a protrusion to be engaged in the groove of the first pivotal portion.

4. The tripod as described in claim 1, wherein the at least two legs each comprise a third section telescopically received in the second pivotal portion of the second section thereof.

5. The tripod as described in claim 1, wherein the supporting plate rotates around the main body from a first position at which the supporting plate is parallel to a top surface of the main body to a second position at which the supporting plate is perpendicular to the top surface of the main body.

6. The tripod as described in claim 5, wherein a screw extending from the supporting plate for securing a camera perpendicular to a top surface of the supporting plate.

7. The tripod as described in claim 1, wherein a rubber foot is mounted at a distal end of each of the legs.

8. The tripod as described in claim 1, wherein the other leg has the same configuration as each of the at least two legs.

9. The tripod as described in claim 1, wherein the legs are fixed to have a determined length thereof via an Anti Leg Rotation locking system.

10. A tripod for supporting a camera comprising:
    a main body;
    a supporting plate pivotally connecting with a top of the main body; and
    three legs pivotally connecting with a bottom of the main body, each of at least two of the three legs comprising an upper portion pivotally connecting with the main body and a lower portion pivotally engaging with the upper portion and telescopically received in the upper portion, the lower portion being pivotable relative to the upper portion to form an angle between the upper and lower portions.

11. The tripod as described in claim 10, wherein the upper portion of each of the at least two legs is telescopic.

12. The tripod as described in claim 10, wherein the main body forms a connecting portion extending upwardly thereof, the supporting plate pivotally engaging with the connecting portion.

13. The tripod as described in claim 12, wherein the other leg is located apart from the connecting portion of the main body.

* * * * *